United States Patent
Mannuccini et al.

(10) Patent No.: US 10,608,428 B2
(45) Date of Patent: Mar. 31, 2020

(54) SYSTEMS AND METHODS FOR HYBRID VOLTAGE AND CURRENT CONTROL IN STATIC UPS SYSTEMS

(71) Applicant: ABB Schweiz AG, Baden (CH)

(72) Inventors: Andrea Mannuccini, Locarno (CH); Silvio Colombi, Losone (CH)

(73) Assignee: ABB SCHWEIZ AG, Baden (CH)

( * ) Notice: Subject to any disclaimer, the term of this patent is extended or adjusted under 35 U.S.C. 154(b) by 961 days.

(21) Appl. No.: 14/568,632

(22) Filed: Dec. 12, 2014

(65) Prior Publication Data

US 2016/0036215 A1    Feb. 4, 2016

Related U.S. Application Data

(60) Provisional application No. 62/030,843, filed on Jul. 30, 2014.

(51) Int. Cl.
*H02H 9/02* (2006.01)
*H02J 9/06* (2006.01)
*H02M 1/32* (2007.01)

(52) U.S. Cl.
CPC ............... *H02H 9/02* (2013.01); *H02J 9/062* (2013.01); *H02M 1/32* (2013.01)

(58) Field of Classification Search
CPC ...... H02J 9/062; H02J 2009/063; H02H 9/02; H02M 1/32; H02M 7/487
See application file for complete search history.

(56) References Cited

U.S. PATENT DOCUMENTS

| | | |
|---|---|---|
| 5,473,528 A | 12/1995 | Hirata et al. |
| 5,579,197 A | 11/1996 | Mengelt |
| 6,122,184 A * | 9/2000 | Enjeti .................. H02M 1/126 363/47 |
| 6,191,500 B1 | 2/2001 | Toy |
| 6,630,752 B2 | 10/2003 | Fleming et al. |
| 7,459,803 B2 | 12/2008 | Mosman |
| 7,825,541 B2 | 11/2010 | Herbener et al. |
| 2005/0036248 A1 | 2/2005 | Klikic et al. |

(Continued)

FOREIGN PATENT DOCUMENTS

| | | | |
|---|---|---|---|
| WO | 2013101432 A2 | 7/2013 | |
| WO | WO 2013187883 A1 * | 12/2013 | ............ H02M 7/487 |

OTHER PUBLICATIONS

European Search Report and Written Opinion issued in connection with corresponding EP Application No. 5176637.5-1804 dated Dec. 1, 2015.

(Continued)

*Primary Examiner* — Thienvu V Tran
*Assistant Examiner* — Christopher J Clark
(74) *Attorney, Agent, or Firm* — Barnes & Thornburg LLP (57) ABSTRACT

A system is provided. The system includes a plurality of uninterruptible power supplies (UPSs), each UPS of the plurality of UPSs including an inverter, a ring bus, and at least one controller communicatively coupled to the plurality of UPSs, the at least one controller configured to determine when a bridge current in at least one UPS of the plurality of UPSs reaches a predetermined bridge current limit, and modify, in response to the determination, a capacitor voltage in the inverter of the at least one UPS to reduce a DC fault current component of a load current in the inverter.

21 Claims, 7 Drawing Sheets

(56) References Cited

U.S. PATENT DOCUMENTS

| | | |
|---|---|---|
| 2005/0200205 A1 | 9/2005 | Winn et al. |
| 2006/0012312 A1* | 1/2006 | Lyle, Jr. ............. H05B 41/2824 <br> 315/194 |
| 2009/0174260 A1* | 7/2009 | Wu ........................ H02J 9/062 <br> 307/65 |
| 2011/0170322 A1* | 7/2011 | Sato ....................... H02J 9/062 <br> 363/40 |
| 2013/0076142 A1 | 3/2013 | Johnson, Jr. |
| 2013/0176757 A1* | 7/2013 | Morati .................. H02M 7/537 <br> 363/71 |
| 2013/0193761 A1 | 8/2013 | Colombi et al. |
| 2013/0223114 A1* | 8/2013 | Nakayama .............. H02M 1/32 <br> 363/55 |
| 2014/0003103 A1* | 1/2014 | Aaltio .................... H02M 1/32 <br> 363/56.03 |
| 2014/0062201 A1 | 3/2014 | Giuntini et al. |
| 2014/0167809 A1* | 6/2014 | Sebald ................... G01R 31/42 <br> 324/764.01 |
| 2014/0183955 A1* | 7/2014 | Colombi .................. H02J 3/38 <br> 307/64 |

OTHER PUBLICATIONS

Herbener, Frank, "Isolated-Parallel UPS Configuration", Piller Power System, pp. 1-15.

Mosman, Mike, "ISO-Parallel Rotary UPS Configuration", Newslink Fall 2004, 7×24 Exchange, pp. 1-16, 2005.

First Office Action issued in connection with CN Application No. 201510457216.5, dated May 29, 2018.

European Patent Office, Communication pursuant to Article 94(3) for EP15176637.5, dated Apr. 1, 2019, 5 pages.

* cited by examiner

SYSTEMS AND METHODS FOR HYBRID VOLTAGE AND CURRENT CONTROL IN STATIC UPS SYSTEMS

CROSS REFERENCE TO RELATED APPLICATIONS

This application is a non-provisional application and claims priority to U.S. Provisional Patent Application Ser. No. 62/030,843 filed Jul. 30, 2014 for "SYSTEMS AND METHODS FOR HYBRID VOLTAGE AND CURRENT CONTROL IN STATIC UPS SYSTEMS", which is hereby incorporated by reference in its entirety.

BACKGROUND

The field of the invention relates generally to uninterruptible power supplies, and more particularly, to reducing a DC fault current component in the event of a bolted fault.

Robust power systems enable supplying power to one or more loads. Such power systems may include combinations of generation, transport, rectification, inversion and conversion of power to supply energy for electronic, optical, mechanical, and/or nuclear applications and loads. When implementing power systems and architectures, practical considerations include cost, size, reliability, and ease of implementation.

In at least some known power systems, one or more uninterruptible power supplies (UPSs) facilitate supplying power to a load. UPSs facilitate ensuring that power is continuously supplied to one or more critical loads, even when one or more components of a power system fail. Accordingly, UPSs provide a redundant power source. UPSs may be utilized in a number of applications (e.g., utility substations, industrial plants, marine systems, high security systems, hospitals, datacomm and telecomm centers, semiconductor manufacturing sites, nuclear power plants, etc.). Further, UPSs may be utilized in high, medium, or low power applications. For example, UPSs may be used in relatively small power systems (e.g., entertainment or consumer systems) or microsystems (e.g., a chip-based system).

BRIEF DESCRIPTION

In one aspect, a system is provided. The system includes a plurality of uninterruptible power supplies (UPSs), each UPS of the plurality of UPSs including an inverter, a ring bus, at least one controller communicatively coupled to the plurality of UPSs, the at least one controller configured to determine when a bridge current in at least one UPS of the plurality of UPSs reaches a predetermined bridge current limit, and modify, in response to the determination, a capacitor voltage in said inverter of the at least one UPS to reduce a DC fault current component of a load current in the inverter.

In another aspect, at least one controller for controlling a power supply system that includes a plurality of uninterruptible power supplies (UPSs), a ring bus, and at least one load electrically coupled to the plurality of UPSs and the ring bus is provided. The at least one controller includes a processor, and a memory device communicatively coupled to said processor, said memory device storing executable instructions configured to cause the processor to determine when a bridge current in an inverter of at least one UPS of the plurality of UPSs reaches a predetermined bridge current limit, and modify, in response to the determination, a capacitor voltage in the inverter to reduce a DC fault current component of a load current in the inverter.

In yet another aspect, a method of controlling a power supply system that includes a plurality of uninterruptible power supplies (UPSs), a ring bus, and at least one load electrically coupled to the plurality of UPSs and the ring bus is provided. The method includes determining when a bridge current in an inverter of at least one UPS of the plurality of UPSs reaches a predetermined bridge current limit, and modify, in response to the determination, a capacitor voltage in the inverter to reduce a DC fault current component of a load current in the inverter.

DETAILED DESCRIPTION

The systems and methods described herein utilize a hybrid voltage/current limiting control. Specifically, utilizing the hybrid voltage/current limiting control described herein, it is possible to quickly re-center a fault current, permitting reducing (e.g., halving) the size of a choke as compared to other approaches. The current limiting control takes over as soon as a predetermined bridge current limit is reached. As a result, the voltage briefly drops, re-centering a fault current and substantially eliminating a large DC fault current that would otherwise occur.

Exemplary embodiments of an uninterruptible power supply system are described here. A plurality of uninterruptible power supplies are arranged in a ring bus configuration and configured to supply power to at least one load. At least one control device is communicatively coupled to the plurality of uninterruptible power supplies.

Figure 1:
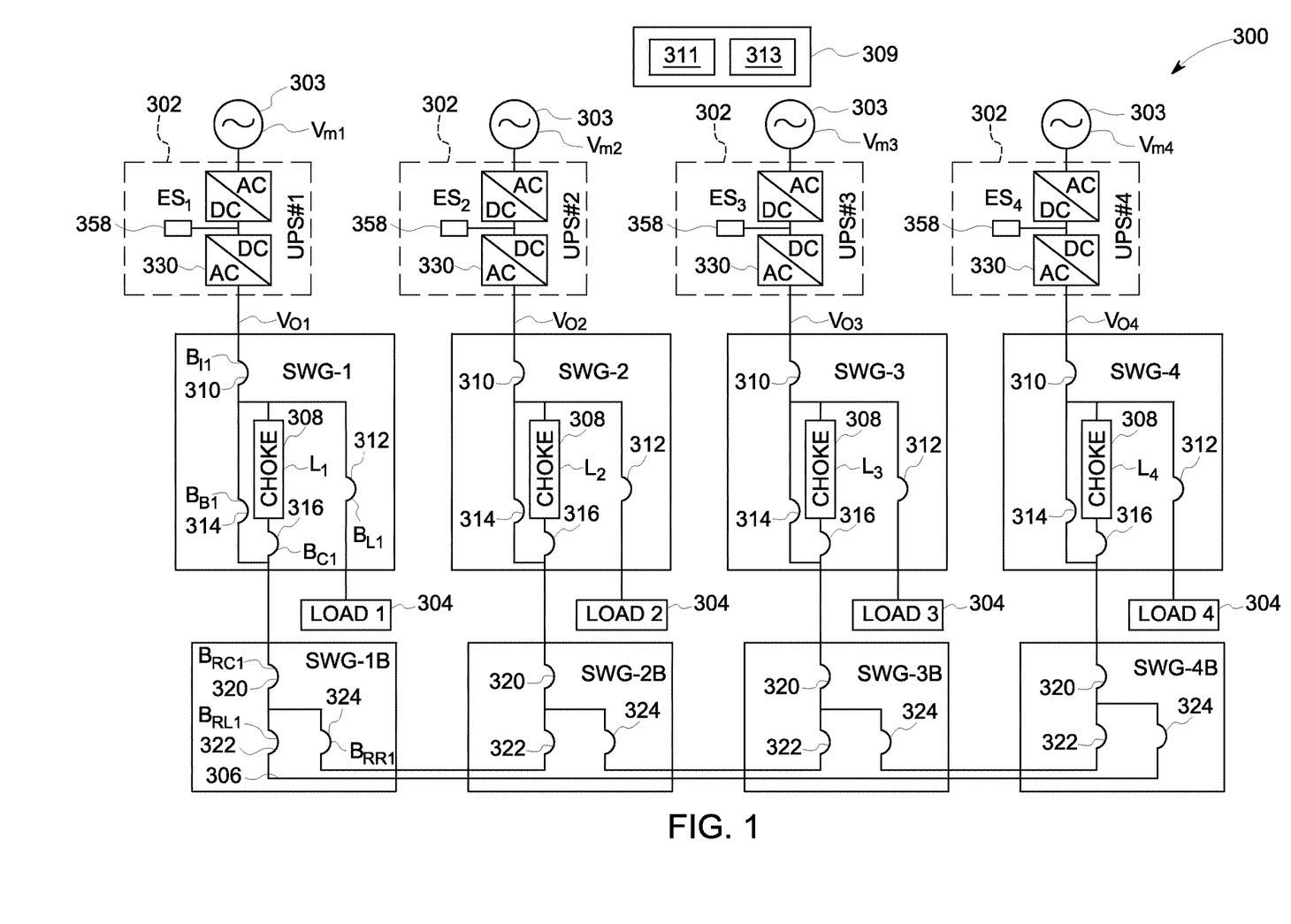
FIG. 1 is a diagram of an exemplary ring bus architecture.

FIG. 1 is a schematic diagram of an exemplary redundant isolated-parallel (IP) uninterruptible power supply (UPS) ring bus architecture 300. In the exemplary embodiment, architecture 300 includes a plurality of UPSs 302 arranged in a ring architecture, or parallel architecture, as described herein. Specifically, architecture 300 includes four UPSs 302 in the exemplary embodiment. Alternatively, architecture 300 may include any number of UPSs 302 that enable architecture 300 to function as described herein. In the exemplary embodiment, architecture 300 is a three wire system. Alternatively, architecture 300 may be a four wire system (typically to supply loads that require a neutral wire).

In the exemplary embodiment, UPSs 302 are static double conversion UPSs (i.e., true on-line system systems). Both static and rotary UPSs may require droop control techniques for both voltage and frequency. In some cases, droop control for frequency alone may be sufficient. In some embodiments, droop control techniques are modified in order to handle non-linear loads.

Architecture 300 facilitates providing power to one or more loads 304. Under normal operation, one or more utilities function as a voltage source 303 and provide power alternating current (AC) power to loads 304. Generators may also function as voltage sources 303. Notably, voltage sources 303 do not need to be synchronized in architecture 300. This is advantageous, as every UPS 302 may be fed by an individual generator and/or utility, and there is no need to add additional equipment to synchronize voltage sources 303.

In the event of a failure of voltage source 303 or of the UPS rectifier, UPS 302 utilizes energy storage systems 358 (e.g., batteries, flywheels, etc. with their converter) connected to UPSs 302 to keep power flowing to loads 304, as described herein. Further, if a given UPS 302 fails, loads 304 are fed power through a ring bus 306, as described herein. In the exemplary embodiment, architecture 300 includes four loads 304. Alternatively, architecture 300 may include any suitable number of loads 304 that enable architecture 300 to function as described herein.

In the exemplary embodiment, each UPS 302 is electrically coupled to an associated load 304, and coupled to ring bus 306 through an associated choke 308 (e.g., an inductor). In architecture 300, without proper synchronization, UPSs 302 cannot work properly due to undesirable circulation currents. Accordingly, in the exemplary embodiment, at least one controller 309 controls operation of UPSs 302. More specifically, at least one controller 309 controls a frequency of an output voltage of each UPS 302, as described herein. The frequency for each UPS 302 is calculated as a function of power, as described herein.

In some embodiments, architecture 300 includes a separate, dedicated controller 309 for each UPS 302. Alternatively, system may include a single controller 309 that controls operation of all UPSs 302. Each controller 309 may include its own power system (not shown) such as a dedicated energy source (e.g., a battery). In some embodiments, each controller 309 is coupled to a substitute controller (not shown) that may be used in the event that controller 309 fails.

In the exemplary embodiment, each controller 309 is implemented by a processor 311 communicatively coupled to a memory device 313 for executing instructions. In some embodiments, executable instructions are stored in memory device 313. Alternatively, controller 309 may be implemented using any circuitry that enables controller 309 to control operation of UPSs 302 as described herein. For example, in some embodiments, controller 309 may include a state machine that learns or is pre-programmed to determine information relevant to which loads 304 require power.

In the exemplary embodiment, controller 309 performs one or more operations described herein by programming processor 311. For example, processor 311 may be programmed by encoding an operation as one or more executable instructions and by providing the executable instructions in memory device 313. Processor 311 may include one or more processing units (e.g., in a multi-core configuration). Further, processor 311 may be implemented using one or more heterogeneous processor systems in which a main processor is present with secondary processors on a single chip. As another illustrative example, processor 311 may be a symmetric multi-processor system containing multiple processors of the same type. Further, processor 311 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 311 causes controller 309 to operate UPSs 302, as described herein.

In the exemplary embodiment, memory device 313 is one or more devices that enable information such as executable instructions and/or other data to be stored and retrieved. Memory device 313 may include one or more computer readable media, such as, without limitation, dynamic random access memory (DRAM), static random access memory (SRAM), a solid state disk, and/or a hard disk. Memory device 313 may be configured to store, without limitation, application source code, application object code, source code portions of interest, object code portions of interest, configuration data, execution events and/or any other type of data.

In the exemplary embodiment, as described in more detail below, one or more controllers 309, and more specifically processor 311, calculates an output voltage frequency for each UPS 302, and one or more controllers 309 operate each UPS 302 at the calculated frequency. Operating each UPS 302 at their respective calculated frequencies as determined by the droop controls makes it possible to achieve load sharing and stability in architecture 300. The frequencies of operation across the various UPSs 302 are different in transient conditions (e.g., following a variation of one or more loads 304). Once the droop controls are in steady state, all UPSs 302 operate at the same frequency but with a phase shift across chokes 308 that equalizes the active power provided by each UPS 302.

In architecture 300, each UPS 302 is able to supply power to an associated local load 304, as well as transfer active and reactive power to ring bus 306 through an associated choke 308. In the exemplary embodiment, architecture 300 facilitates sharing local loads 304 equally between UPSs 302 without any communication using droop controls, and in particular, frequency versus active power and voltage versus reactive power. This removes limitations on the number of UPSs 302 in architecture 300.

In the exemplary embodiment, architecture 300 includes a number of circuit breakers. Specifically, for each UPS 302, a first circuit breaker 310 is electrically coupled between UPS 302 and choke 308, a second circuit breaker 312 is electrically coupled between first circuit breaker 310 and local load 304, a third circuit breaker 314 is electrically coupled between first circuit breaker 310 and ring bus 306, and a fourth circuit breaker 316 is coupled between choke 308 and ring bus 306. Further, at ring bus 306, a central circuit breaker 320, a left circuit breaker 322, and a right circuit breaker 324 are associated with each UPS 302, and facilitate isolating UPS 302 from ring bus 306 and/or other UPSs 302 on ring bus 306. Each circuit breaker 310, 312, 314, 316, 320, 322, and 324 includes associated logic and relays (neither shown) for operation. The protection scheme provided by circuit breakers 310, 312, 314, 316, 320, 322, and 324 facilitates locating faults in architecture 300 and isolating those faults by opening the appropriate breakers. Further, third circuit breakers 314, also referred to as bypass breakers, facilitate bypassing choke 308 when the associated UPS 302 fails or is under maintenance. This facilitates improving the quality of the voltage on the associated local load 304 as the voltage drop on choke 308 is removed.

For ring bus applications, chokes 308 are sized to sustain a bolted fault on ring bus 306 for a long enough time to guarantee isolation of the fault through the activation of the specific breakers in architecture 300. Further, for situations where a breaker fails to open, additional time should be built-in to determine and execute an alternative fault isolation strategy. Accordingly, to facilitate maximizing a duration of time where the inverter in an associated UPS 302 can sustain a bolted fault on ring bus 306, chokes 308 may be sized to operate the inverter in a linear mode under a short circuit on ring bus 306. The systems and methods described herein facilitate a rapid elimination of the DC fault current component, as described herein. Accordingly, the size of chokes 308 may be reduced proportionally.

As shown in FIG. 1, each UPS 302 includes an inverter 330. Different designs are possible for inverters 330. For example, for transformerless designs, FIG. 2 is a circuit diagram of an exemplary single phase voltage source two level inverter 400, and FIG. 3 is a circuit diagram of an exemplary single phase voltage source three level inverter 500.

Figure 2:
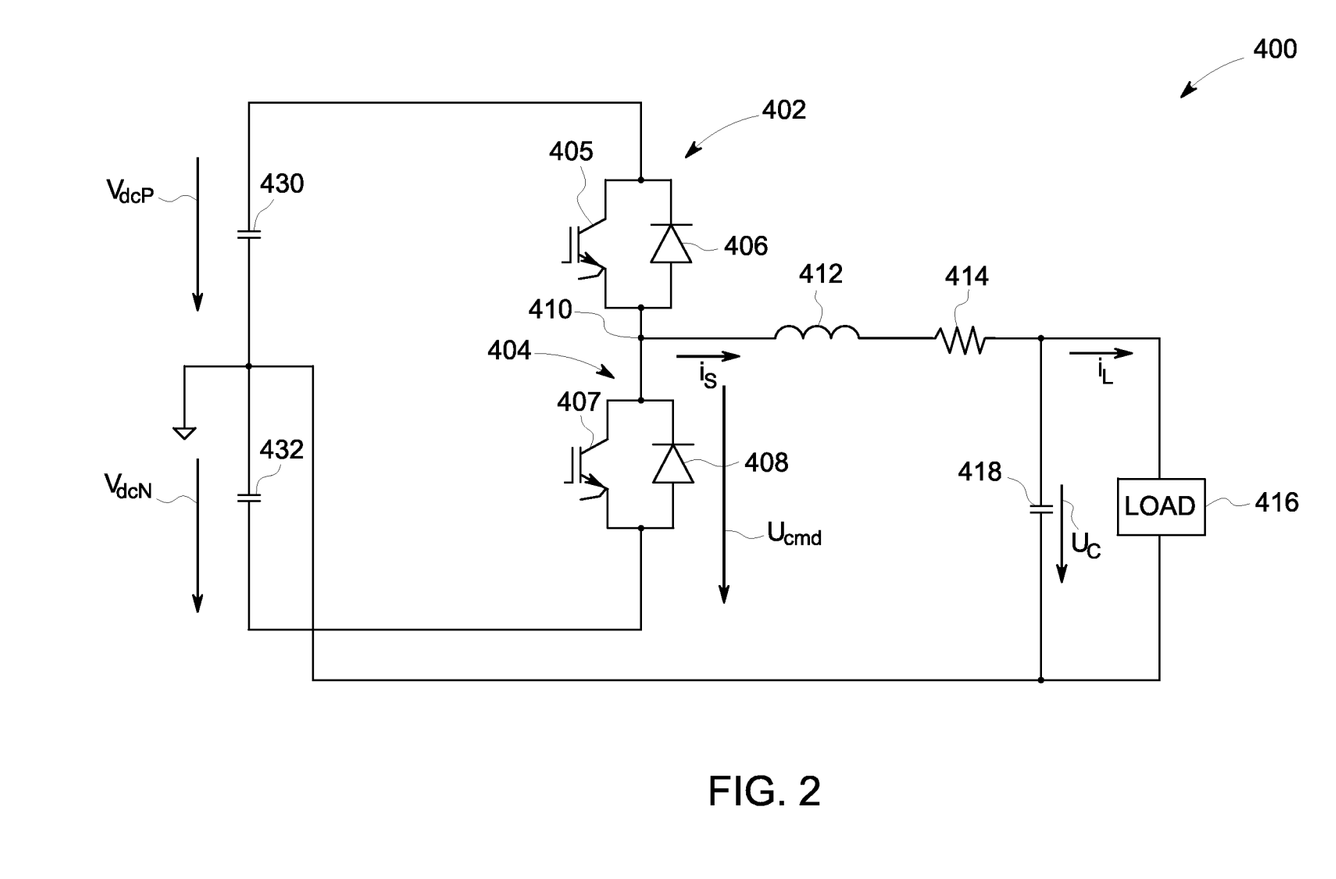
FIG. 2 is a circuit diagram of an exemplary single phase voltage source two level inverter.
Figure 3:
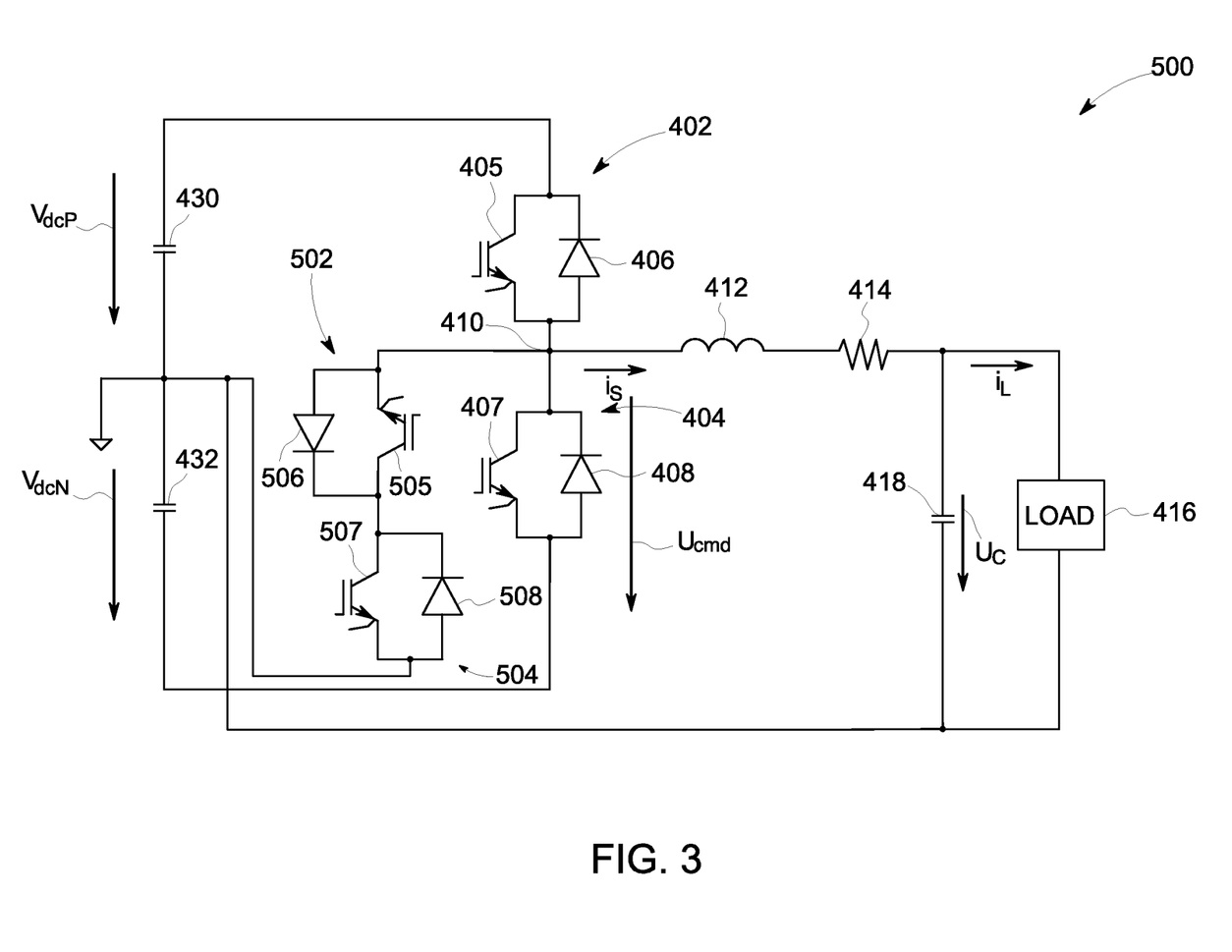
FIG. 3 is a circuit diagram of an exemplary single phase voltage source three level inverter.

As shown in FIG. 2, inverter 400 includes a first switching device 402 and a second switching device 404. First switching device 402 includes a first switch 405 (e.g., a transistor) electrically coupled in parallel with a first diode 406, and second switching device 404 includes a second switch 407 (e.g., a transistor) electrically coupled in parallel with a second diode 408. A voltage across the lower, or second switching device 404 is referred to herein as a command voltage, $u_{cmd}$. A node 410 between first and second switching devices 402 and 404 outputs a bridge current, $i_s$, through an inductor 412 and a resistor 414. Bridge current $i_s$ splits into a load current, $i_L$, that flows to load 416 (such as local load 304) and a current that flows through a capacitor 418. The total load current is the sum of load current $i_L$ and a potential fault current. A voltage across capacitor 418 is referred to as a capacitor voltage, $u_C$. Inverter 400 includes a first DC capacitor 430 electrically coupled between first switching device 402 and neutral 420, and a second DC capacitor 432 electrically coupled between second switching device 404 and neutral 420. The voltage across first DC capacitor 430 is an upper DC link voltage, $V_{dcP}$, and the voltage across second DC capacitor 432 is a lower DC link voltage, $V_{dcP}$.

Unless indicated otherwise, inverter 500 is substantially similar to inverter 400. As shown in FIG. 3, inverter 500 includes a third switching device 502 and a fourth switching device 504 electrically coupled in series between node 410 and neutral 420. Third switching device 502 includes a third switch 505 (e.g., a transistor) electrically coupled in parallel with a third diode 506, and fourth switching device 504 includes a fourth switch 507 (e.g., a transistor) electrically coupled in parallel with a fourth diode 508. Third and fourth switching devices 502 and 504 implement a bi-directional switching device. Alternatively, the bi-directional switching device may be implemented using other components (e.g., using reverse blocking devices). The topologies of inverter 400 and inverter 500 may be implemented as three phase converters by using three legs.

Figure 4:
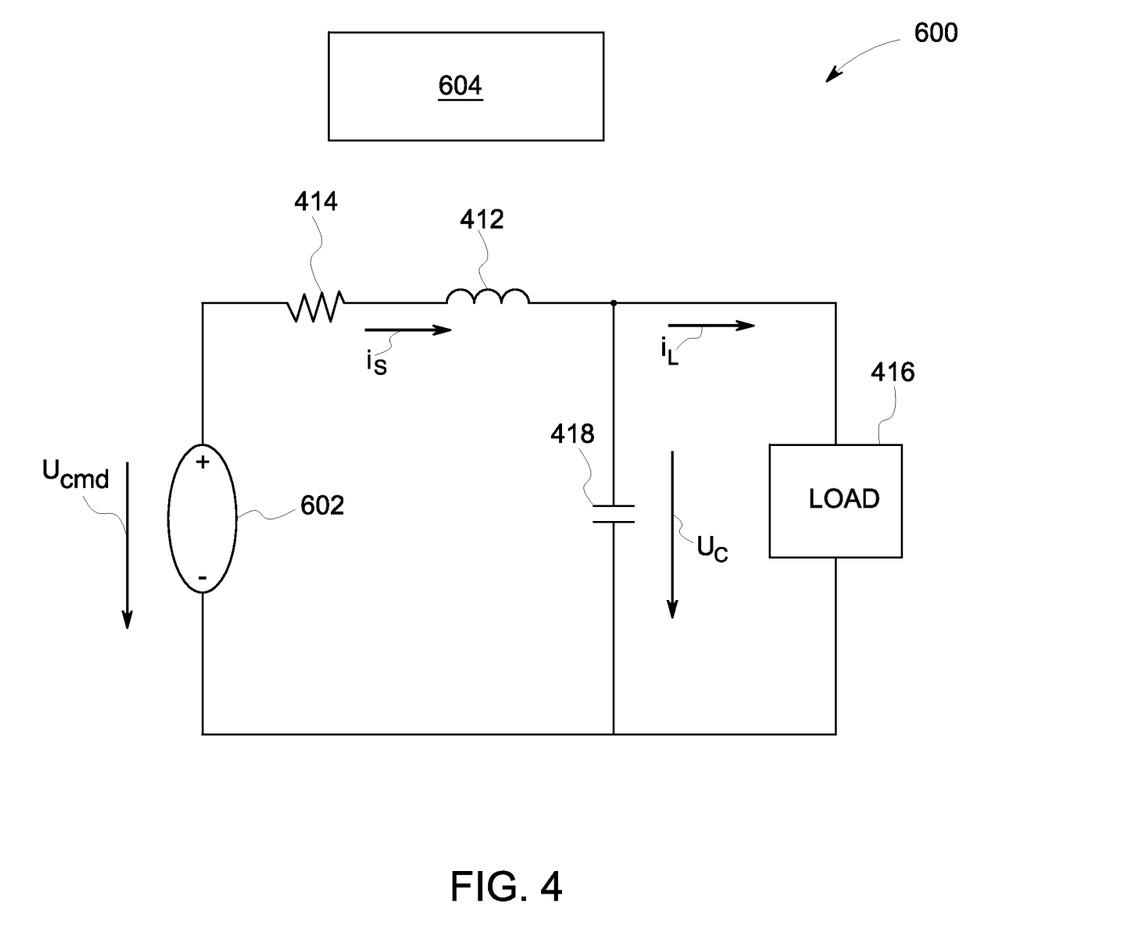
FIG. 4 is a simplified circuit diagram of a single phase inverter.

For both inverter 400 and inverter 500, FIG. 4 is a circuit diagram of the equivalent circuit 600 of a single phase inverter. Circuit 600 includes the command voltage $u_{cmd}$ represented as a voltage source 602. The discontinuous command voltage $u_{cmd}$ models the two or three level inverter. Hence, this voltage may have square wave variations between two or three possible values. In the exemplary embodiment, a controller 604, such as controller 309 (shown in FIG. 1), controls operation of one or more components of circuit 600.

Figure 5:
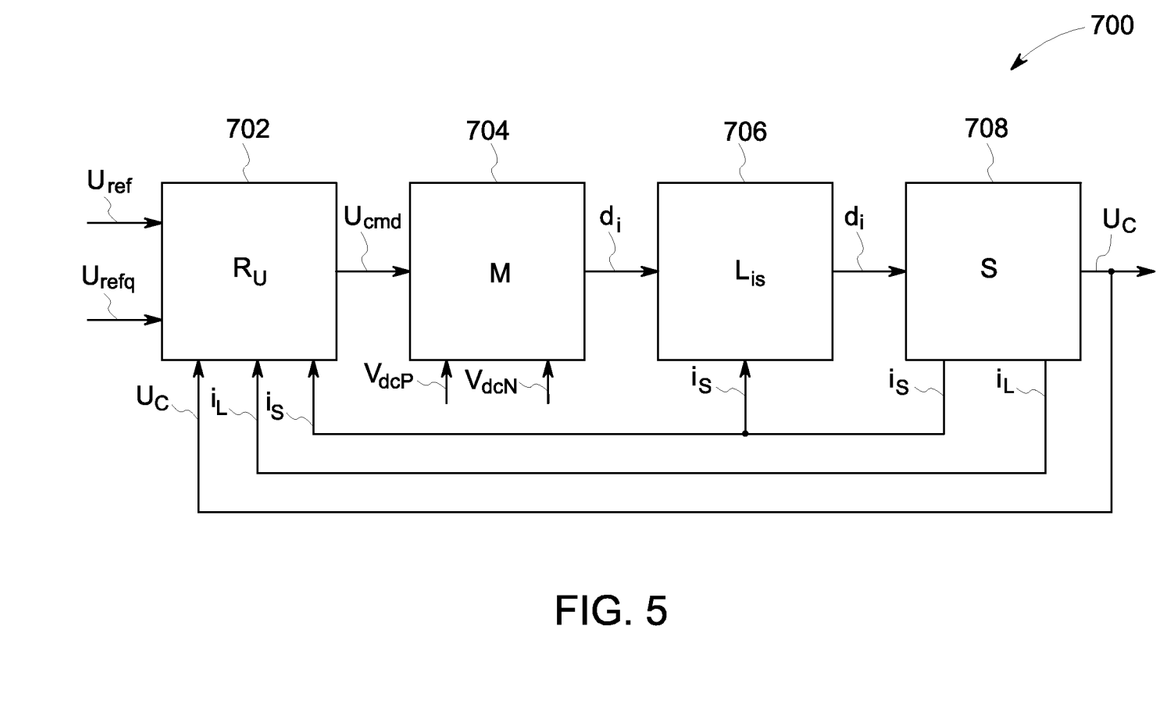
FIG. 5 is a block diagram of a voltage control algorithm with current limitation that may be used with the circuit shown in FIG. 4.

FIG. 5 is a block diagram 700 of an exemplary voltage control algorithm with current limitation that may be used with circuit 600. The steps of block diagram 700 may be performed, for example, using controller 604 (shown in FIG. 4). In block diagram 700, a voltage controller block 702, implements and determines the command voltage $u_{cmd}$ based on a reference voltage, $u_{ref}$, a quadrature reference voltage, $u_{refQ}$, the capacitor voltage $u_c$, the load current $i_L$ and the bridge current $i_s$. The reference voltage $u_{ref}$ and quadrature reference voltage $u_{refQ}$ may be predetermined values stored in a memory, such as memory device 313 (shown in FIG. 1). Alternatively, the reference voltage $u_{ref}$ and quadrature reference voltage $u_{refQ}$ may be computed using equations, for example, in the following manner: $u_{ref}=A*\sin(2*\pi*f*time)$ and $u_{refQ}=B*\cos(2*\pi*f*time)$.

A modulation block 704, M, implements modulation that determines gating signals $d_i$ for power switches (e.g., gating signals $d_1$ and $d_2$ for first and second switches 405 and 407 of inverter 400, and gating signals $d_1 \ldots d_4$ for first, second, third, and fourth switches 405, 407, 505, and 507 of inverter 500). The modulation is adapted as a function of the instantaneous voltages $V_{dcP}$ and $V_{dcN}$ of the upper and lower DC links, respectively. A limitation block 706, $L_{is}$, implements a bridge current limitation that can modify the gating signals $d_i$ for the power switches. In the exemplary embodiment, limitation block 706 uses a hysteresis comparator to check if the bridge current $i_s$ exceeds a predefined current limit, $I_{smax}$.

In particular, considering a positive current, when the bridge current $i_s$ exceeds the limit $I_{smax}$, the gating signals $d_i$ for the switches are modified in such a way to make the current $i_s$ decrease. This depends on the topology of the inverter used. As an example, consider inverter 400 of FIG. 2. For a positive and increasing current $i_s$, first switch 405 is closed and second switch 407 is open. If the current $i_s$ exceeds the limit $I_{smax}$, first switch 405 is commanded to open by limitation block 706. As a result, the current $i_s$ will flow through second diode 408 and will decrease as the LC filter formed by inductor 412 and capacitor 418 is reverse biased. When the current falls below a lower maximal limit $I_{smaxLOW}$ (e.g., approximately 70% of $I_{smax}$), voltage control block 702 and modulation block 704 take over the control again. Control is performed similarly for a negative current, by operating switches to cause the negative bridge current $i_s$ to increase (i.e., move towards zero current) once the negative bridge current $i_s$ falls below a limit $-I_{smax}$.

Limitation block 706 can implement additional features to improve performance in embodiments including a three level inverter (e.g., inverter 500). For example, in inverter 500, the bi-directional switching device formed by third and fourth switching devices 502 and 504 may be used during the current limiting process in order to avoid two level commutations (i.e., from $V_{dcP}$ to $-V_{dcN}$ or the reciprocal thereof). For example, for a positive and increasing bridge current $i_s$, exceeding the limit $I_{smax}$, switches 405, 407, 506, and 508 are commanded by limitation block 706 in order to commutate the command voltage $U_{cmd}$ from $V_{dcP}$ to 0 and then $-V_{dcN}$. This reduces commutation overvoltage on the switches.

In block diagram 700, a system block 708, S, represents the controlled system, in particular the inverter bridge and the LC filter (see FIGS. 2-4). For a three phase system, a three phase inverter may be used in combination with a different controller 604 for every phase. Alternatively, the current limiting strategy described herein may be implemented using a space vector approach.

Figure 6:
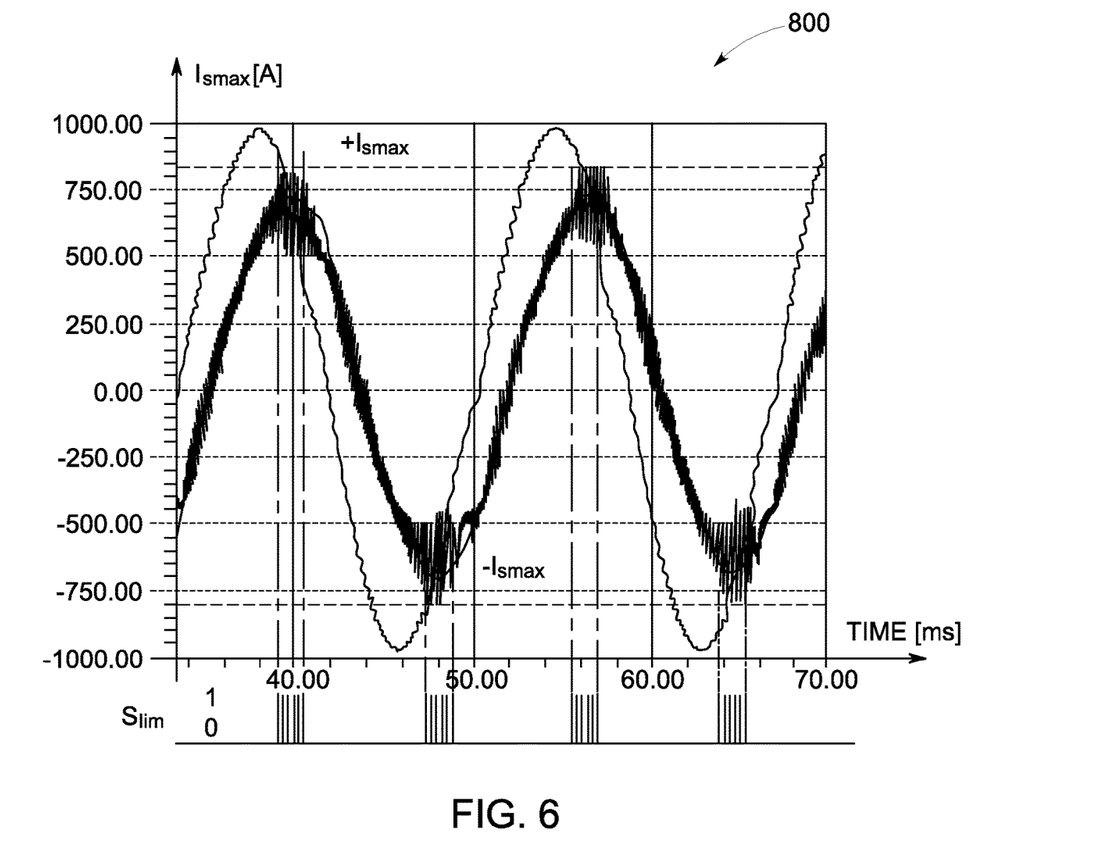
FIG. 6 is a graph illustrating periods of current limiting.

This operation of block diagram 700 is illustrated in FIG. 6, which is a graph 800 that illustrates periods of current limiting when $s_{lim}=1$. The current limiting operation of block diagram 700 may be controlled by a timer mechanism implemented using controller 604 that triggers when the current limit $I_{smax}$ is first hit and then checks the duration against a defined limit (e.g., 100 milliseconds (ms)). To facilitate optimizing the design of inverters in architecture 300, the current limit may be set slightly above the typical maximum 150% overload capability of the inverters that can usually be sustained for 30 seconds (s).

Referring back to FIG. 1, to facilitate maximizing a duration of time where an inverter 330 in an associated UPS 302 can sustain a bolted fault on ring bus 306, chokes 308 are typically sized to operate inverter 330 in a linear mode under a short circuit on ring bus 306.

Figure 7:
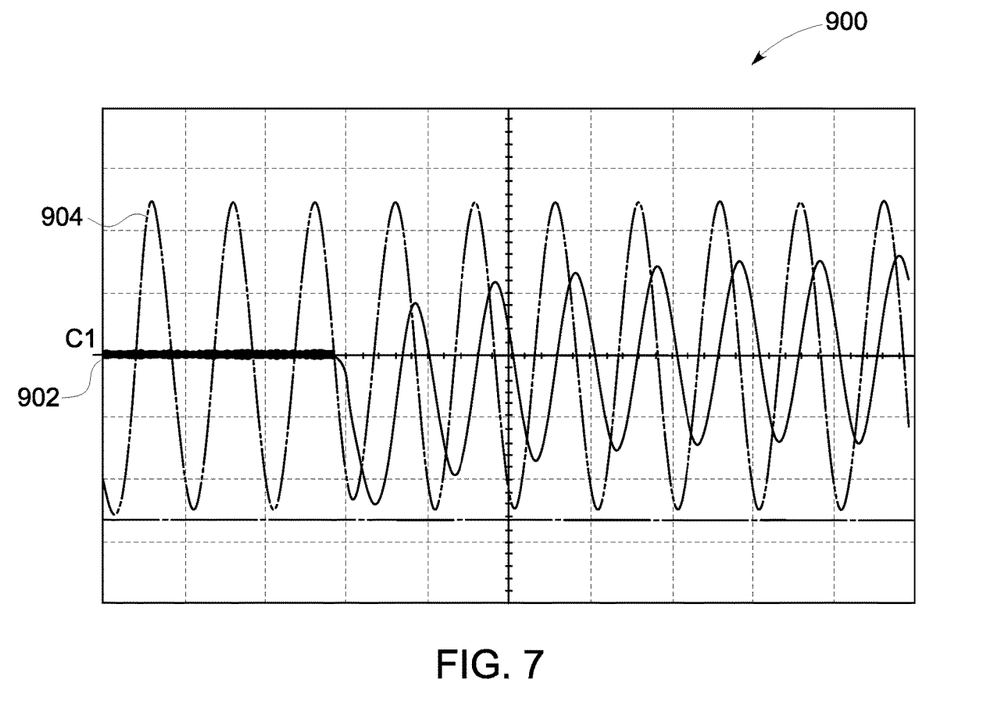
FIG. 7 is a graph illustrating behavior of a fault current.

FIG. 7 is a graph 900 illustrating behavior of a fault current without implementing the hybrid voltage/current control algorithm shown in FIG. 5. Graph 900 includes an inductive fault current curve 902 and a voltage curve 904 plotted over time during a bolted fault on ring bus 306. As shown in FIG. 7, depending on a phase angle of the short circuit on ring bus 306, an inductive fault current through choke 308 can include a relatively large DC component (see, e.g., the initial dip in inductive fault current curve 902). This DC component decays over time to "re-center" with an L/R time constant of choke 308. As shown in FIG. 7, inductive fault current curve 902 re-centers relatively slowly. Accordingly, a transient peak fault current may reach twice a steady state fault current (see, e.g., the initial dip in inductive fault current curve 902).

To keep inverter 330 of UPS 302 operating in a linear mode of operation, one approach is to increase (e.g., double) the size of chokes 308. This may be impractical, as static UPSs, such as UPSs 302, have a limited fault current capability that may demand a relatively large choke.

However, using the hybrid voltage/current control algorithm described herein, it is possible to re-center a fault current relatively quickly, typically in a fraction of a cycle. For example, in FIG. 8, a re-centering time is approximately ¼ of a cycle. Accordingly, the size of choke 308 may be kept relatively small. Specifically, as described above in reference to FIG. 7, a current limiting control is utilized when a maximum bridge current limit, $\pm I_{smax}$, is reached. As a result, the voltage briefly drops (in absolute value), quickly re-centering the fault current.

Figure 8:
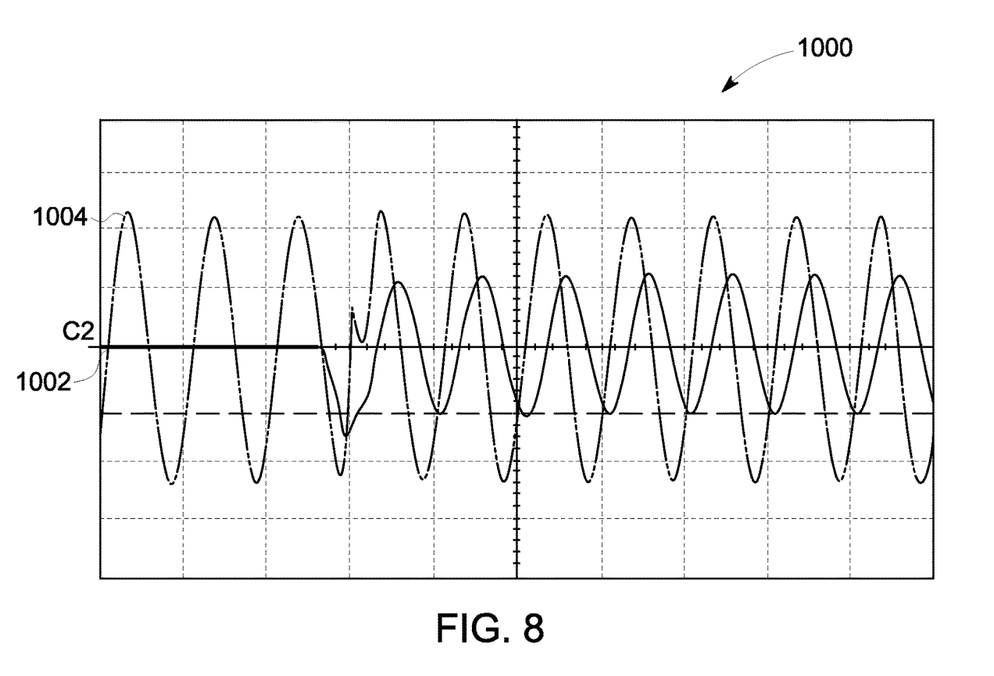
FIG. 8 is a graph illustrating behavior of a fault current when a hybrid voltage/current control algorithm is utilized.

For example, FIG. 8 is a graph 1000 illustrating behavior of a fault current while implementing the hybrid voltage/current control algorithm shown in FIG. 5. Graph 1000 includes an inductive fault current curve 1002 and a voltage curve 1004 plotted over time during a bolted fault on ring bus 306. As shown in FIG. 10, once the bridge current $i_s$ (see FIGS. 2 and 3) reaches the lower threshold $-I_{smax}$, the hybrid voltage/current control algorithm causes voltage curve 1004 to briefly drop, resulting in a relatively quick re-centering of inductive fault current curve 1002. With reference to FIGS. 4 and 8, in the case of a bolted fault on ring bus 306, load 416 is choke 308, inductive fault current curve 1002 is the load current $i_L$, and voltage curve 1004 is the capacitor voltage $u_e$.

In conclusion, utilizing the hybrid voltage/current limiting control described herein, it is possible to quickly re-center the fault current, permitting reducing (e.g., halving) the size of the choke as compared to other approaches. The current limiting control takes over as soon as a predetermined bridge current limit is reached. As a result, the voltage briefly drops (in absolute value), re-centering the fault current and substantially eliminating the large DC fault current that would otherwise occur.

The systems and methods described herein are applicable independent of voltage level, and more particularly, are applicable to both low voltage (LV) (e.g., 480V phase-phase) and medium voltage (MV) (e.g., 13.8 kV phase-phase) applications. For example, although the inverter topologies described herein are typically used in LV systems, the principles of the embodiments described herein can be equally applied to MV systems using appropriate inverter technologies.

As compared to at least some known power systems, the systems and methods described herein facilitate reducing relatively large DC fault currents. Specifically, a control device determines when a bridge current in an inverter reaches a predetermined bridge current limit, and implements, in response to the determination, a hybrid voltage/current limiting control algorithm that modifies a capacitor voltage in the inverter to reduce a DC fault current component of a load current in the inverter.

Exemplary embodiments of systems and methods for uninterruptible power supplies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

At least one technical effect of the systems and methods described herein includes (a) determining when a bridge current in an inverter of one UPS of a plurality of UPSs reaches a predetermined bridge current limit; and (b) modifying, in response to the determination, a capacitor voltage in the inverter to reduce a DC fault current component of a load current in the inverter.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A system comprising:
   a plurality of uninterruptible power supplies (UPSs), each UPS of the plurality of UPSs comprising an inverter;

a ring bus, wherein an output of the inverter of each UPS of the plurality of UPSs is coupled to the ring bus; and at least one controller communicatively coupled to at least one UPS of the plurality of UPSs, the at least one controller configured to:

determine a first set of gating signals for a plurality of switches in the inverter of the at least one UPS, based on a modulation function of: (i) an upper DC link voltage that flows across a first DC capacitor electrically coupled between a first switch of the plurality of switches and a neutral node and (ii) a lower DC link voltage that flow across a second DC capacitor electrically coupled between a second switch of the plurality of switches and the neutral node;

determine a bridge current applied to a circuit in the inverter of the at least one UPS, the circuit comprising an inductor, a resistor, and a capacitor;

modify the first set of gating signals to reduce the bridge current when the bridge current exceeds a first predetermined bridge current limit, wherein the modification of the first set of gating signals: (i) reduces a DC current component of a load current in the inverter of the at least one UPS and (ii) re-centers the DC current component of the load current in the inverter of the at least one UPS in less than one cycle of the load current; and control, in response to determining that the bridge current has reached a second predetermined bridge current limit, the at least one UPS using a command voltage based on: (i) one or more reference voltage values, (ii) a voltage across the capacitor, (iii) the load current, and (iv) the bridge current.

2. The system of claim 1, wherein the inverter of the at least one UPS comprises a single phase voltage source two level inverter.

3. The system of claim 1, wherein the inverter of the at least one UPS comprises a single phase voltage source three level inverter.

4. The system of claim 1, further comprising at least one circuit breaker coupled between the at least one UPS and the ring bus.

5. At least one controller for controlling a power supply system that includes a plurality of uninterruptible power supplies (UPSs), a ring bus, and at least one load electrically coupled to the plurality of UPSs and the ring bus, said at least one controller comprising:

a processor; and a memory device communicatively coupled to the processor, the memory device storing executable instructions configured to cause the processor to:

determine a first set of gating signals for a plurality of switches in an inverter of at least one UPS of the plurality of UPSs, based on a modulation function of: (i) an upper DC link voltage that flows across a first DC capacitor electrically coupled between a first switch of the plurality of switches and a neutral node and (ii) a lower DC link voltage that flow across a second DC capacitor electrically coupled between a second switch of the plurality of switches and the neutral node;

determine when a bridge current applied to a circuit in the inverter of the at least one UPS reaches a first predetermined bridge current limit, the circuit comprising an inductor, a resistor, and a capacitor;

modify, in response to determining that the bridge current has reached the first predetermined bridge current limit, the first set of gating signals to reduce the bridge current to (i) reduce a DC current component of a load current in the inverter of the at least one UPS and (ii) re-center the DC current component of the load current in the inverter of the at least one UPS in less than one cycle of the load current; and determine, after the bridge current has reached a second predetermined bridge current limit, a second set of gating signals based upon (i) the upper DC link voltage, (ii) the lower DC link voltage, and (iii) a command voltage, wherein said command voltage is based on at least a reference voltage value, the load current, and the bridge current, wherein the second predetermined bridge current limit is set to approximately 70% of the first predetermined bridge current limit.

6. The at least one controller of claim 5, wherein, in a single phase voltage source three level inverter, a voltage over the capacitor is altered based on the modification of the first set of gating signals.

7. The at least one controller of claim 5, wherein, in a single phase voltage source two level inverter, a voltage over the capacitor is altered based on the modification of the first set of gating signals.

8. The at least one controller of claim 5, wherein the load current is a sum of a current through the at least one load and a fault current in the at least one UPS.

9. The at least one controller of claim 5, wherein the at least one controller comprises a plurality of controllers, each controller of the plurality of controllers configured to control a different UPS of the plurality of UPSs.

10. A method of controlling a power supply system that includes a plurality of uninterruptible power supplies (UPSs), a ring bus, and at least one load electrically coupled to the plurality of UPSs and the ring bus, the method comprising:

determining when a bridge current in an inverter of at least one UPS of the plurality of UPSs reaches a first predetermined bridge current limit;

modifying, in response to determining that the bridge current has reached the first predetermined bridge current limit, a capacitor voltage in the inverter to reduce a DC component of a load current in the inverter;

determining when the bridge current in the inverter reaches a second predetermined bridge current limit, said second predetermined bridge current limit is not an overcurrent limit; and controlling, in response to determining that the bridge current has reached the second predetermined bridge current limit, the power supply system using a command voltage, wherein the command voltage is based on: (i) one or more reference voltage values, (ii) the capacitor voltage, (iii) the load current, and (iv) the bridge current.

11. The method of claim 10, wherein modifying the capacitor voltage comprises implementing a control algorithm that modifies gating signals for switches in the inverter when the bridge current reaches the first predetermined bridge current limit.

12. The method of claim 11, wherein implementing the control algorithm comprises modifying the gating signals such that a magnitude of the DC component of the load current decreases.

13. The method of claim 10, wherein the inverter of the at least one UPS is a single phase voltage source three level inverter.

14. The method of claim 10, wherein said inverter of the at least one UPS is a single phase voltage source two level inverter.

15. The method of claim 10, wherein modifying a capacitor voltage comprises implementing a control algorithm that reduces the DC current component of the load current through a choke associated with the at least one UPS.

16. The method of claim 10, further comprising re-centering the DC current component in less than one cycle of the load current.

17. The system of claim 5, wherein the inverter of the at least one UPS lacks a diode that is directly connected to either (i) the neutral node and the first switch or (ii) the neutral node and the second switch.

18. The method of claim 10, wherein the power supply system further includes a first switching device and a second switching device, and wherein the command voltage is representative of a voltage across the second switching device.

19. The system of claim 1, wherein the first predetermined bridge current limit is set above 150% of an overload capability for said inverter of at least one UPS of the plurality of UPSs.

20. The system of claim 1, wherein said inverter of at least one UPS of the plurality of UPS s lacks a diode that is directly connected to the neutral node.

21. The method of claim 10, wherein the second predetermined bridge current limit is set to approximately 70% of the first predetermined bridge current limit.

* * * * *